April 4, 1967 T. H. PARIS ET AL 3,312,335
BELT TRACKING DEVICE
Filed Sept. 2, 1965
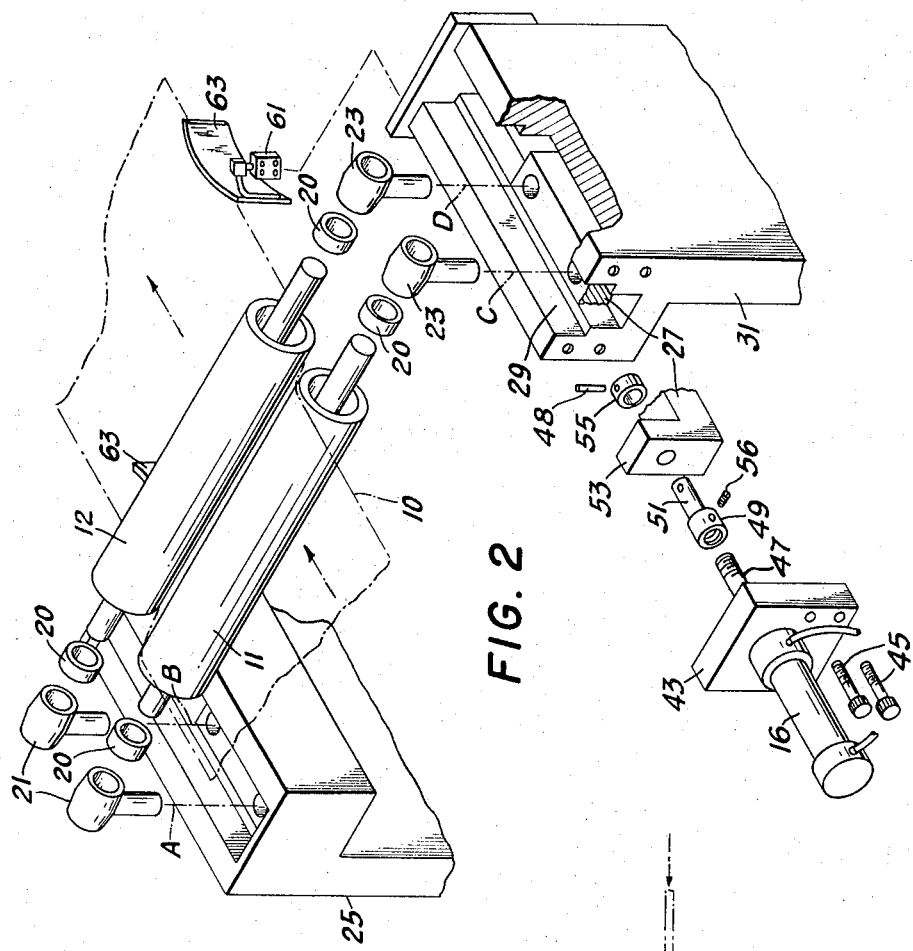
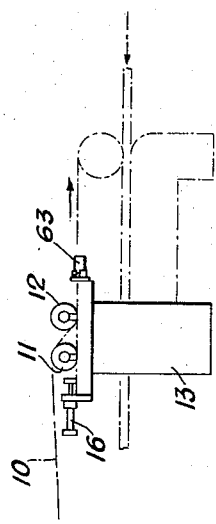
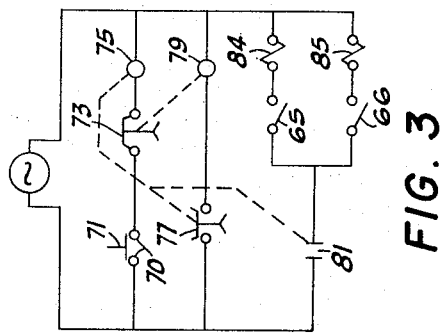
INVENTORS
THOMAS H. PARIS &
CHARLES H. RODGERS
BY
their Attorney

United States Patent Office 3,312,335
Patented Apr. 4, 1967

---

3,312,335
BELT TRACKING DEVICE
Thomas H. Paris, Trenton, N.J., and Charles H. Rodgers, Sykesville, Md., assignors to Koppers Company, Inc., a corporation of Delaware
Filed Sept. 2, 1965, Ser. No. 484,684
4 Claims. (Cl. 198—202)

This invention relates generally to control systems having an intermittent or discontinuous correcting action and more particularly to control systems for automatically maintaining a belt or web on a predetermined line of travel.

Control systems usually sense the deviation of a parameter from a given datum and provide a correcting action to reduce the deviation. The systems tend to become complex and sophisticated, measuring the extent of deviation, conforming the amount of correction to the extent of deviation, constraining the correction to the rate of change of deviation and the like.

In accordance with this invention there is provided a simple yet effective control system which responds when the deviation of a parameter extends beyond a given datum to a predetermined extent and usually for a predetermined time and then provide a correcting action to decrease the deviation, the correcting action being made in an intermittent or discontinuous and periodic manner with the maximum length of correction period being preset to become effective.

As a practical example of the invention, an embodiment of the invention is illustrated as being incorporated in an endless belt conveying system used in the manufacture of corrugated paperboard. As well understood by those skilled in the art, the invention is equally applicable to maintain traveling webs of sheet material along a datum line on predetermined path of travel.

In the manufacture of corrugated paperboard, it is conventional to move the web from one operation to another by sandwiching it between a pair of endless conveying belts. For example, the web may be transported over a series of heated plates used to gelatinize the adhesive between various laminations of the web. Other belts convey the web onward. There used to be a plurality of other belts, but a recent trend has been to substitute a simple wide belt for the plurality of narrow belts. Due to manufacturing tolerances of the machine parts and random stresses and strains on the belt, it has a tendency to wander from a straight line path of travel. Consequently, the web is moved by the belt from the desired path. This results in wasted web material since trimming of the edge of the web usually occurs at subsequent in-line stations; other operations may also be adversely affected.

This invention, therefore, provides a novel system for maintaining a belt automatically along a predetermined centerline of travel; the datum in this instance being the predetermined centerline of travel and the wander of the belt from this line being the deviation to be corrected.

The above and further objects and novel features of the invention will appear more fully from the following detailed description when the same is read in connection with the accompanying drawings. It is to be expressly understood, however, that the drawings are not intended as a definition of the invention but are for the purpose of illustration only.

In the drawings wherein like parts are marked alike:

FIGURE 1 is a side elevation view of a belt for conveying corrugated web from one operation to another in the manufacture of corrugated board;

FIGURE 2 is an exploded isometric view of the working parts of the novel tracking and correction system of an embodiment of this invention;

FIGURE 3 is a schematic electrical circuit for the control portion of FIG. 2.

Referring now to FIG. 1, there is illustrated an endless belt 10 traveling in the direction of the arrow over a roll 11 and under a roll 12. These rolls are supported on a standard 13, and the position of the rolls transverse to the direction of travel is controlled by a fluid motor 16 as required in response to deviations of the belt from a predetermined centerline. As the rolls 11 and 12 are skewed from an angle perpendicular to the desired line of travel, the belt will shift so that its centerline shifts from a deviated line of travel to the desired line of travel.

Referring now to FIG. 2, the rolls 11 and 12 are journaled for rotation in bearings 20 secured within bearing supports 21 and 23. These supports are also journaled to rotate about respective axes A, B, C and D. Supports 21 are journaled in a support stand 25 fixed to the frame of the conveyor. Supports 23, however, are journaled in a carrier 27 which rests in guideways 29 of a standard 31 fixed to the other side of the conveyor frame. Thus rolls 11 and 12 extend in parallel transversely across the endless belt.

Carrier 27 is positioned in ways 29 by a fluid motor 16 having a flange 43 that is secured in a suitable way, for example, by bolts 45 to the standard 31. Fluid motor 16 may be of conventional type having a piston which is displaced along a cylinder in response to differential pressure applied to either side of the piston. A shaft 47 extends from the piston.

Threaded on shaft 47 is a coupling 49 having a further shaft 51 which extends through an upright 53 on carriage 27. A lock flange 55 by means of pin 48 maintains a fixed relationship between coupling 49, shaft 51, flange 55 and upright 53. Thus movement of shaft 47 causes relative movement of carrier 27 in guideways 29 of standard 31. The initial position of the carrier, consequently of rolls 11 and 12 to conform to the datum line, can be preset by threading member 49 on shaft 47 at the proper position and locking it thereon by means of set-screw 56.

To sense a deviation of the belt from the datum line and to make the necessary correction to shift the belt back to the datum line, there is provided a simple, yet effective, system of sensing and correcting devices. Time delay devices are provided which permit the correcting devices to operate for a predetermined length of time in the event that the sensors indicate that a correction is required. To prevent overcorrection and consequently, a hunting effect, the time in which the correction device is operative is a shorter time than the interval at which the need for correction may be sensed. As as example, a time delay is provided which will close a pair of contacts for ½ second at intervals of 2 seconds. Sensors are provided to feel the edge of the belt; the sensor closing a pair of contacts for a predetermined interval of time in response to engagement with the belt. When the sensor responsive contacts are closed at the same time that delay responsive contacts are closed, the circuit is completed to the correction motor and a correction is made for a predetermined time, which time is shorter than the interval at which the need for correction is sensed. Thus, the system senses the need for a correction and periodically a correction is made if required.

A pair of feelers or sensors 61 sense the position of the belt. These may be secured to the standards 25, 31 in any suitable manner. A curved finger 63 extends from each of the sensors. Upon engagement of the belt with the finger of the sensor, a switch 65, 66 is closed. The closing of the switch then serves to actuate fluid motor 16 to position carriage 27 in a direction to skew rolls 11 and 12 to move the belt 10 away from the sensor.

The electrical arrangement for controlling fluid motor 16 is illustrated schematically in FIG. 3. The circuit may be energized from a conventional 110 volt source. Upon the closing of contacts 70 by "on" switch 71, energy is supplied through normally closed contacts 73 to a time delay coil 75. After a predetermined interval of time, which interval is conveniently adjustable, the coil becomes energized to close the normally open contacts 77 thereby completing a circuit through a second time delay coil 79. The energization of coil 75 also closes contact 81 thus applying energy to the switch portion of switches 65 and 66. Thereafter the closing of either switch 65 or 66 will energize its respective solenoid 84 or 85 of conventional spool-type metering fluid control valves and actuate the fluid motor 16. After a predetermined time as set by time delay coil 79, the coil becomes operative, opening the normally closed switch 73. This then de-energizes the time delay coil 75 which then de-energizes the time delay coil 79. This cycle of energizing and de-energizing of coils 75 and 79 is repeated as long as the conveyor is in operation. Time delay devices 75 and 79 are conventional.

As will be evident above, only during the time that delay coil 75 is energized to close contacts 81, is the switch 65 or 66 operative to actuate fluid motor 16. As a result of the foregoing arrangement, upon a deviation of the belt from the predetermined centerline, the sensor is actuated to operate the motor only after a predetermined elapsed time and the motor is operable to make a correction only for a predetermined length of time. Then it is at rest for a period of time. Thus the correction applied to the belt is a slow correction and is applied only by small increments, and a sufficient interruption of time is applicable to make certain that further correction is necessary before a further correction is made in the skew of the rolls.

The foregoing has described a simple yet efficient system for maintaining a belt on a predetermined line of travel. The rolls which cause the belt to return, should the belt deviate from the line of travel, are pivoted about fixed axes, A, B, at one end and pivoted about fixed axes, C, D, at the other end, the latter axes, however, being movable by way of carriage 27 along a path longitudinally of and parallel to the preset line of travel of the belt to skew the rolls, 11, 12, along a line generally transverse of the line of travel. A correction is made by motor 16 only during the time delay coil 75 is energized to close contacts 81; and during the time coil 75 is not so energized, the motor 16 is not operated. This enables the result of the correction to be determined before a new correction is made.

We claim:

1. A control for maintaining a web in a predetermined line of travel comprising:
    a pair of web-guiding rolls extending generally transversely across the web and spaced apart along the periphery of one roll and under the periphery of the other roll,
    means for pivoting said rolls at one end,
    a carriage connecting said rolls at the other end,
    a correction motor operably connected to said carriage,
    cyclic means for periodically as a function time rendering said correction motor effective and ineffective for positioning said carriage,
    sensing means responsive to changes in lateral position of said web, and
    means operable in response to said sensing means and connected to said correction motor to cause said motor to position said carriage during the time period said motor is rendered effective thereby changing the transverse position of said rolls to maintain the web along a predetermined line of travel.

2. A control for maintaining a web in a predetermined line of travel comprising:
    a pair of web guiding rolls extending generally transversely across the web and being pivotable at one end thereof,
    said web passing over the periphery of one of said rolls and passing under the periphery of the other of said pair of rolls,
    a carriage slidably connected to a support for said rolls and connecting said rolls at the ends thereof opposite said pivotable ends,
    sensing means responsive to changes in lateral position of said web,
    first time delay and second time delay means, said second time delay means responsive to said first time delay means, and
    a correction motor operably connected to said carriage and responsive to said second time delay means and to said sensing means, said second time delay means operating said correction motor for a predetermined length of time, and said first time delay means maintaining said correction motor inoperative for a predetermined length of time whereby said rolls are positioned to guide said web in response to said sensing means at only predetermined time intervals that are independent of said changes in lateral position of said web.

3. Apparatus for maintaining a web in a predetermined line of travel comprising:
    a pair of web-guiding rolls extending generally transversely across the web whereby said web can pass over the periphery of one of said rolls and under the periphery of the other of said rolls,
    a carriage,
    means pivotably supporting said rolls on said carriage,
    sensing means responsive to changes in the lateral position of said web,
    first and second delay means,
    means interconnected between said first and second time delay means for cyclic operation so that a predetermined time after the actuation of said first time delay means, said first time delay means actuates said second time delay means and a further predetermined time after the actuation of said second time delay means, said second time delay means renders inactive said first time delay means whereby said cycle is repeated,
    a control motor for positioning said carriage, and
    means for actuating said motor in response to said sensing means and second time delay means, and
    means for rendering said sensing means effective to operate said control motor only during the times said second time delay means is actuated.

4. Apparatus for maintaining a web in a predetermined line of travel comprising:
    a pair of web-guiding rolls extending generally transversely across the web whereby said web can pass over the periphery of one of said rolls and under the periphery of the other of said rolls,
    a carriage,
    means pivotably supporting said rolls on said carriage,
    power means for positioning said carriage,
    sensing means responsive to changes in the lateral position of said web for actuating said power means, and
    cyclic means interconnecting said sensing means and said power means for rendering said sensing means effective and ineffective for actuating said power means in accordance with a preset time schedule that is independent from said changes in lateral position of said web.

(References on following page)

References Cited by the Examiner

UNITED STATES PATENTS

| | | | |
|---|---|---|---|
| 2,797,091 | 6/1957 | Fife | 226—22 |
| 2,782,902 | 2/1957 | Sloane | 198—203 |
| 2,842,361 | 7/1958 | Muller | 226—21 |
| 3,009,664 | 11/1961 | Huck | 226—22 |
| 3,119,535 | 1/1964 | Hoffman | 74—241 |

EVON C. BLUNK, *Primary Examiner.*

RICHARD E. AEGERTER, *Examiner.*